Aug. 31, 1954
H. B. JOHNSON
2,687,803
METHOD AND APPARATUS FOR THE ELECTROSTATIC
SEPARATION OF CORN FROM ITS IMPURITIES
Filed April 17, 1950
5 Sheets-Sheet 4
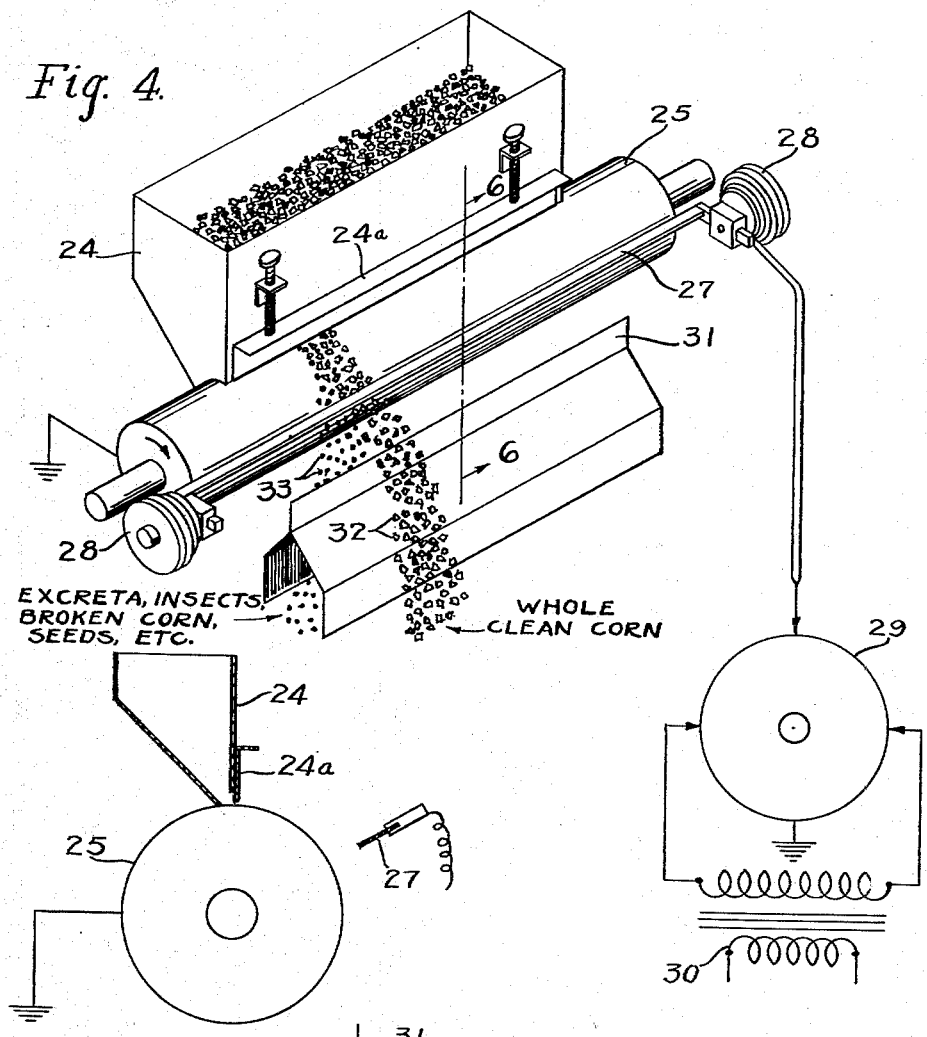
*Fig. 4.*
*Fig. 5.*
INVENTOR.
Herbert B. Johnson
BY
HIS ATTORNEY Patented Aug. 31, 1954

2,687,803

UNITED STATES PATENT OFFICE 2,687,803

METHOD AND APPARATUS FOR THE ELECTROSTATIC SEPARATION OF CORN FROM ITS IMPURITIES

Herbert B. Johnson, Rochester, N. Y., assignor to The Quaker Oats Company, Chicago, Ill., a corporation of New Jersey Application April 17, 1950, Serial No. 156,288

14 Claims. (Cl. 209—127)

This invention relates to methods and apparatus for cleaning corn to prepare it for conversion into its various food products for human consumption. In the harvesting, storage, transportation and handling of corn, it becomes unavoidably contaminated with highly objectionable impurities, such as rat, mice and other rodent excreta, insects, worms, weevil, infested and damaged grains, seeds, trash and the like. The amount or percent weight content of these impurities varies considerably in raw corn supplies from different localities, as well as with the amount and nature of its handling and the length of time and conditions under which the grain is stored prior to milling operations.

The methods of cleaning corn heretofore practiced have generally involved the use of complicated and bulky equipment such as employed for gravity separations, pneumatic separations and sizing or sifting separations, requiring the use of machines such as pneumatic gravity separators, aspirators, washers, scourers, and screens, all operating on the known principles of mechanical separation and depending upon the gravity effects of differences in particle weights and upon sizing treatment based upon the differences in particle shapes and sizes.

The milling of corn comprises several operations which may be divided into three general divisions known as cleaning operations; conditioning, drying, degerminating and classifying operations; and grinding, sifting, purification and packaging operations. While my invention may be employed at different points in the course of such operations, I prefer to employ it initially at the beginning of milling operations because of the advantages of eliminating, in advance of such operations, all of the impurities referred to above, since many of these foreign matters and impurities tend to propagate, multiply and spread, and to accumulate in the corners of bins, conveyors and cleaning apparatus so that all of the milling equipment tends to become infested and require expensive, periodical fumigation.

Depending upon the size of the corn mill and type of cleaning equipment employed, the recovery of the whole corn grains, forming the most valuable part of the product, has heretofore varied rather widely from 85 to 98% of the raw corn mixture treated, frequently involving a large percentage of loss. The elimination of the impurities referred to has likewise ranged widely from 60 to 90% of the total impurities in the raw corn, requiring further and expensive elimination in the course of grinding, grading, sifting and milling operations which produce the salable corn products. Initial cleaning of the raw corn is desirable for the highest recovery of whole corn and the highest elimination of associated impurities, to yield maximum profit and purest food products, while the resulting simplification of further milling operations tends to eliminate considerable equipment and reduce the capital investment, power requirements and maintenance and supervision costs.

One object of the invention, therefore, is to provide an improved method of cleaning corn of a more simple, practical and efficient nature.

Another object is to supply such a method for separating whole corn from broken and infested grains, rodent excreta, insects, worms, foreign seeds, and the like by subjecting raw corn mixtures to electrostatic separation treatment based upon differences in the electrical conductivity and weight of the pure whole corn, broken grains and the impurities referred to above.

Another important object is to remove, by the use of electrostatic separation, the rodent excreta, particularly rat excreta, which is of the same size as the corn but of variable density and absorbency and which cannot be removed by present pneumatic, sizing and gravity operations that are now employed in corn milling operations. By this application of a new basic principle of cleaning corn, the percent weight recovery of clean corn is considerably increased and the total impurity removal efficiency is much greater than can be accomplished by any corn milling purifying units now used.

It has been found that raw corn mixtures from different localities, harvested at different seasons of the year or stored for different lengths of time and under different conditions, tend to acquire variable moisture contents affecting the electrostatic susceptibility of the particles and the suitable electrostatic treatment. Another object, therefore, is to provide a method and apparatus of the above character capable of being readily and efficiently adapted to such varying conditions by proper tempering and conditioning of the raw corn mixtures, as well as by suitable adaptation of the electrostatic methods employed so as to recover a much cleaner whole corn product by eliminating a much higher percentage of the very objectionable impurities.

Another object is to provide a method adapted to be carried out by an apparatus of increased efficiency and economy in floor space, so as to be capable of installation in a relatively small building area.

Another object is to afford a method having the above advantages and capable of a high rate of commercial production while effecting a substantial reduction in capital investment and operating and maintenance expenses.

A further object is to provide such a method including an efficient sterilizing treatment of the whole corn product to improve its quality as a food material.

Still a further object is to supply an improved apparatus for carrying out the above method, more efficient in its parts and in the combination and arrangement thereof.

To these and other ends the invention resides in certain improvements and combinations of parts and method steps, all as will be hereinafter more fully described, the novel features being pointed out in the claims at the end of the specification.

In the drawings:

Fig. 4 is an enlarged perspective view of the electrode couple shown in Fig. 3;

Fig. 5 is a diagrammatic elevation, partly in section, to further illustrate parts shown in Fig. 4.

Figure 1:
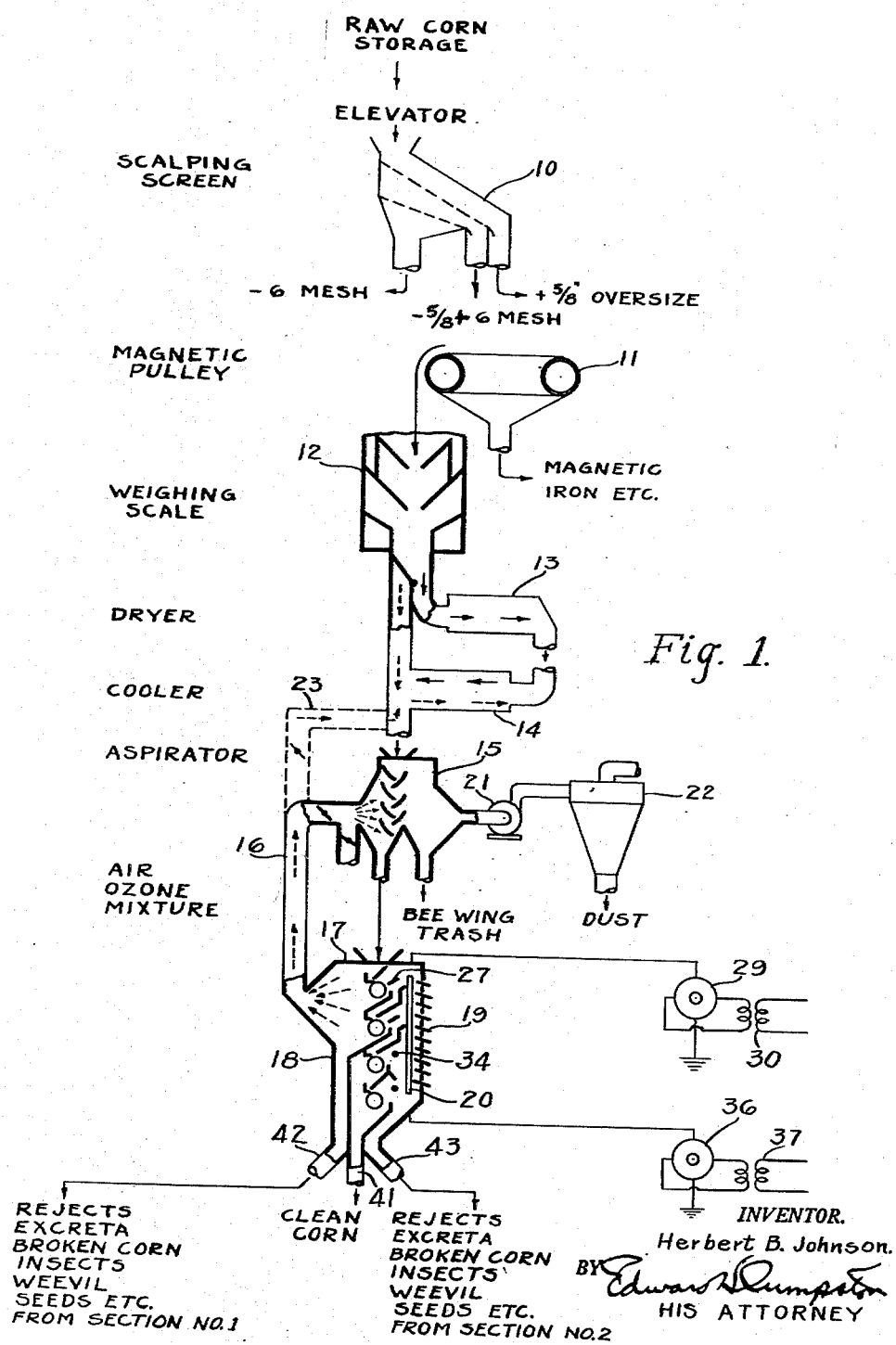
Fig. 1 is a flow sheet showing an adaptation of the method and apparatus embodying the present invention.

In the practice of my invention, as illustrated by the flow sheet shown in Fig. 1 of the drawings, for example, the raw corn supply is preferably delivered at the mill into a loading elevator and fed to a scalping screen 10, of known construction, which removes the coarser foreign materials and trash, such as corn cobs, pieces of wood, and the like, larger in size than the whole corn. The mixture discharged from this scalping screen is then passed over a magnetic separator or pulley 11, of known construction, which removes all of the magnetic iron, nails, and other metallic objects which might cause considerable damage if passed through the milling equipment. From this magnetic separator the mixture is then passed to and weighed by an automatic scale means 12, also of known construction, and delivered thence to devices for tempering and conditioning the mixture to prepare it for efficient cleaning treatment and sterilization by means comprising electrostatic separation apparatus as hereafter described.

The raw corn supply as delivered to the mill commonly comprises portions grown in different localities and stored for varying periods at different times of the year and under varying subjection to moisture and other conditions, resulting in varying total moisture content and in accompanying surface moisture the control of which is important to the efficient electrostatic separation process, particularly when such total moisture contents approximate or exceed about 15%. Where the raw corn supply has been subjected to a natural drying treatment through storage over a period of months the total moisture content of the rodent excreta generally ranges between about 7 and about 9%, while the corn total moisture content ranges from about 12 to about 15%. Within these ranges where the difference in total moisture content of the excreta and other impurities on the one hand and the corn on the other is between about 5 to 7%, the surface moisture and electrostatic separating efficiency can be readily and closely controlled and a uniform recovery of whole, clean corn can be efficiently maintained. Where, however, the raw corn supply has a total moisture content approximately 15 or 16% or more, or the difference between the moisture contents of the rodent excreta and corn is lessened, I have found that it is highly desirable and advantageous to resort to certain steps for controlling the surface moisture of the particles and to certain methods of electrostatic separation as hereafter described.

In cases where the raw corn supply has been stored in bins or other containers and the surface of the corn is comparatively dry, the electrostatic susceptibility of the corn and associated impurities is effectively controlled by allowing it to fall through a current of air in the apparatus hereinafter described. However, when there are comparatively wide variations in the surface moisture of the corn, due to conditions of growth or the way in which it has been stored, transported or handled, such variations in surface dryness can be readily detected by increases or decreases in the percent weight of the clean corn produced by electrostatic separation and the operator, by observation or test weight samples, can readily detect such surface moisture variations.

When the surface moisture content increases appreciably the percent weight of rejected impurity proportions increases from 5 to as high as 15%, which means expensive losses of valuable whole corn in such rejected portions. It has been found that by allowing the mixture to fall through a current of warm air of reasonably low volume and temperature, the small percentage of surface moisture (less than 1% of the total moisture content) of the corn and associated impurities is readily dried and kept dry for a period of time sufficient for effective electrostatic separation, while the mixture is passing through the electrostatic separator. By thus treating the flow of raw corn mixture with a current of warm air, as hereinafter described, during any undue increase in the surface moisture, normal separation is quickly resumed and the percent weight recovery of clean corn and separation of rejected portions is quickly brought within the range of efficiency accomplished by this invention.

During the late fall, winter and early spring months when the total raw corn moisture content commonly exceeds 15%, and may vary up to 20% or even more, it has been found advantageous to pass such corn supplies from the weighing scales 12 through a drier unit 13 and then through a cooler unit 14, both of known construction by which the total moisture content of the corn is reduced to approximately 15% and its temperature reduced to normal, as best suited for subsequent operation. Even after such treatment, however, there may be at times some sweating and variation in the surface moisture content of the corn and impurities and this is corrected by passing the mixture through an aspirator device 15, of known and suitable construction. In this aspirator unit the mixture is allowed to fall through a current of dry air or warm air or inert gases, as referred to above, and preferably supplied through the electrostatic separating apparatus as will now be described.

Preferably such drying air or gas is supplied to the aspirator 15 through a pipe 16 connected to the casing 17 of an electrostatic separating apparatus indicated generally at 18, which is provided with an air intake 19 and with a heating device 20 of known and suitable construction comprising, for example, steam coils or "Calrod" or other known heating means. The air or gas is preferably drawn through this device past the electrode couples of the electrostatic separation apparatus hereafter described, and through the pipe 16 and the aspirator under suction produced by a fan or blower 21 discharging to a dust collector 22. This has several important advantages. It assures a more constant, perfectly dry surface on the corn and presents a more uniform electrostatic separating condition. It removes any dust which is made from the mixture in passing through the number of electrodes which may be employed to insure complete separation of the corn and impurities. It reduces to a minimum any possible fire or explosion hazards of the corn flour-like dust collecting or circulating in the electrostatic separating apparatus. Furthermore, it supplies the treating air current with a substantial content of ozone. This mixture of air and ozone, heated if desired by the device 20, serves to not only further dry the mixture particles passing through the aspirator, but also to sterilize the particles through the known sterilizing effects of subjection to ozone. If desired, such heated air and ozone mixture from the separating apparatus may be allowed to rise past the aspirator 15 through a pipe 23 directly to the cooler unit through which it passes in counterflow in contact with the corn mixture under control by suitable valves in the pipes 16 and 23, as shown.

With a naturally occurring or induced total moisture content in the raw corn mixture of about 15% or less, I have found it desirable to employ what I term a "high intensity" type of electrostatic separating treatment preferably carried out by apparatus such as illustrated in Figs. 2 to 5, inclusive, comprising a feed hopper 24 provided with an adjustable feed control gate (not shown) of known and suitable construction through which the corn mixture is delivered, in a uniform flow in a thin stream approximately one particle thick, to a grounded rotary cylindrical electrode 25, made preferably of brass or copper, from 4 to 8 inches in diameter and 6, 8 or 12 feet long. Its surface may be smooth or somewhat roughened and it is continuously rotated in suitable bearings by any known and suitable means (not shown), to produce a linear surface speed between about 200 and about 300 feet per minute, depending upon particular operating conditions. It has been found beneficial at times to maintain the surface in clean condition by keeping in brushing contact with it a suitable brush or wiper 26 (Fig. 3), to assure a clean metallic contact between the electrode surface and the raw corn mixture.

As the corn mixture is delivered from the hopper to the top of the rotating electrode 25 it is conveyed and discharged from the electrode, under combined gravitational and centrifugal forces, into an electrostatic field or ionizing bombardment zone created by the conveying electrode 25 and a stationary thin or ribbon-like electrode blade 27 preferably co-extensive in length with the electrode 25 and supported at its ends by high tension insulating devices 28 of known and suitable construction.

Ribbon electrode 27 preferably has a thickness between 0.003 and 0.015 of an inch, so as to present a continuous thin edge toward the adjacent surface of electrode 25 and parallel therewith as shown. Electrode 27 may be made of steel, copper or other suitably conductive metal and its width transversely of its thin edge is preferably as small as consistent with rigid support of its edge in parallel relation with the surface of electrode 25. Such restriction of its cross-sectional dimensions serves to limit the radiation losses and power input required. The edge of electrode 27 is preferably spaced at a distance from the surface of electrode 25 between about ½ and about 2 inches, depending upon the condition of the material to be treated, the impressed voltage and the like.

The voltage applied to ribbon electrode 27 is considerably higher than has been generally used heretofore in electrostatic separation apparatus, preferably ranging between about 20,000 and about 40,000 volts, depending upon the condition of the material to be treated, and the like. This electrode is preferably mounted by known and suitable means (not shown) so that its position may be adjusted not only toward and from the surface of electrode 25 but also concentrically about the axis thereof. It is preferably located at or above a horizontal plane through the center of the rotary conveying electrode and on the opposite side of a vertical plane tangent to the latter, as shown. With electrode 27 located on the horizontal center line of electrode 25, I preferably use a higher range of voltages up to, say, 40,000 volts, but the electrode may be raised to positions 15 or 30° above such horizontal position and in such raised positions the voltages may be somewhat reduced, as low, say, as 20,000 or 22,000 volts. These voltages are supplied by suitable connections with a rectifier 29 of known and suitable construction energized by generating means represented by a transformer coil 30, as well understood in the art.

I have further found that a thin blade or ribbon-like electrode 27 such as described, particularly when impressed with a high negative voltage, supplies a much better corona discharge having a greater static surface covering power for such large particles as whole corn than does a pin-point type of electrode or one having a positive electrical charge. This corona discharge, furthermore, has been found to be more evenly distributed or uniform and to supply sufficient electrostatic pressure over the considerable lengths of the electrodes required for practical quantity production operations.

Figure 6:
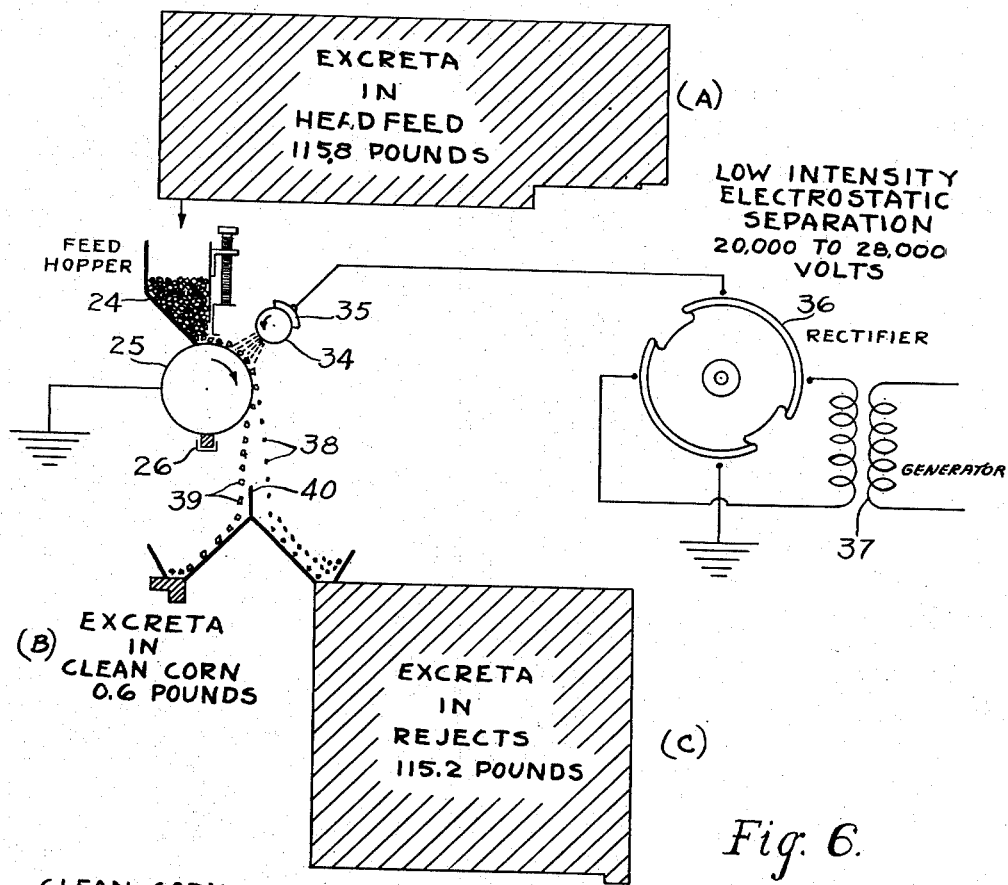
Fig. 6 is a view similar to Fig. 3, but showing a different portion of the electrostatic apparatus.

Such spraying of the mixture particles with electrical charges, causing them to stick to the rotary conveying electrode 25, has a depressing effect which is opposed to the centrifugal force imparted by the rotary electrode and tending to repel the particles. The particles of whole corn, being better conductors than the excreta and other impurities, tend to give up their charges more rapidly to the grounded electrode 25, while they are more subject to the action of centrifugal force because of their greater mass. On the other hand, the particles of the impurities, tending to have a lower moisture content and conductivity, give up their charges to the grounded electrode at a smaller rate and so are more subject to the depressing effect of such charges, while being less subject to centrifugal force in view of their lesser mass. By suitable coordinating adjustments of the speed of electrode 25 and the position and impressed voltage of ribbon electrode 27, as readily determined by trials, I have found that the corn grains of greater mass and lesser electrical resistance may be repelled in advance of the particles of impurities of lesser mass and greater electrical resistance, so that these portions may be made to fall on opposite sides of the usual adjustable divider plate 31, as at 32 and 33, respectively, and thus separately collected for suitable disposition.

Where the moisture content of the mixture is 15% or more, or the difference between the moisture contents of the corn and impurities is reduced and it is not feasible to overcome these difficulties by the tempering or conditioning treatments described above, as sometimes occurs during the summer months, I have found that the desired cleaning separation may be efficiently accomplished by suitably adapting the electrostatic separation process. In this case, the linear speed of the conveying electrode is reduced to, say, 100 feet per minute or less, so as to substantially eliminate the application of centrifugal force to the mixture as it is discharged through the electrical field. Also, the thin blade or ribbon electrode 27 is replaced by a rotary cylindrical electrode 34 (Figs. 2 and 6), preferably constructed of brass or copper with a smooth surface and a diameter between about 2 and about 8 inches. This electrode is located with its periphery at a distance of between ⅞ and two inches from the periphery of the conveying electrode 25 and known and suitable means (not shown) are provided for rotating electrode 34 at suitably low speeds. Known and suitable brush or wiper means 35 are provided for maintaining a clean surface and preventing electrical leakage or corona discharge between the two electrodes. In this case, electrode 34 is charged with a negative voltage of between about 20,000 and about 28,000 volts, by connection with a known or suitable rectifier 36 energized by generating means represented by a transformer coil 37, as well understood in the art. In view of this lower voltage I have termed the treatment of the mixture between these electrodes as a "low intensity" type of electrostatic separation.

In the use of this low intensity type of separation it has been found that the electrostatic behavior of the corn and associated impurities in reversed from that which is obtained in the high intensity separation described above, with the result that the particles of impurities having high moisture content and increased conductivity are repelled as at 38 from the grounded conveying electrode, while the whole corn grains, substantially unaffected by centrifugal force, are dropped down by gravity behind the impurities as at 39. By means of the usual adjustable divider plate 40, these portions of the mixture are readily divided and separately collected for suitable disposition.

Figure 2:
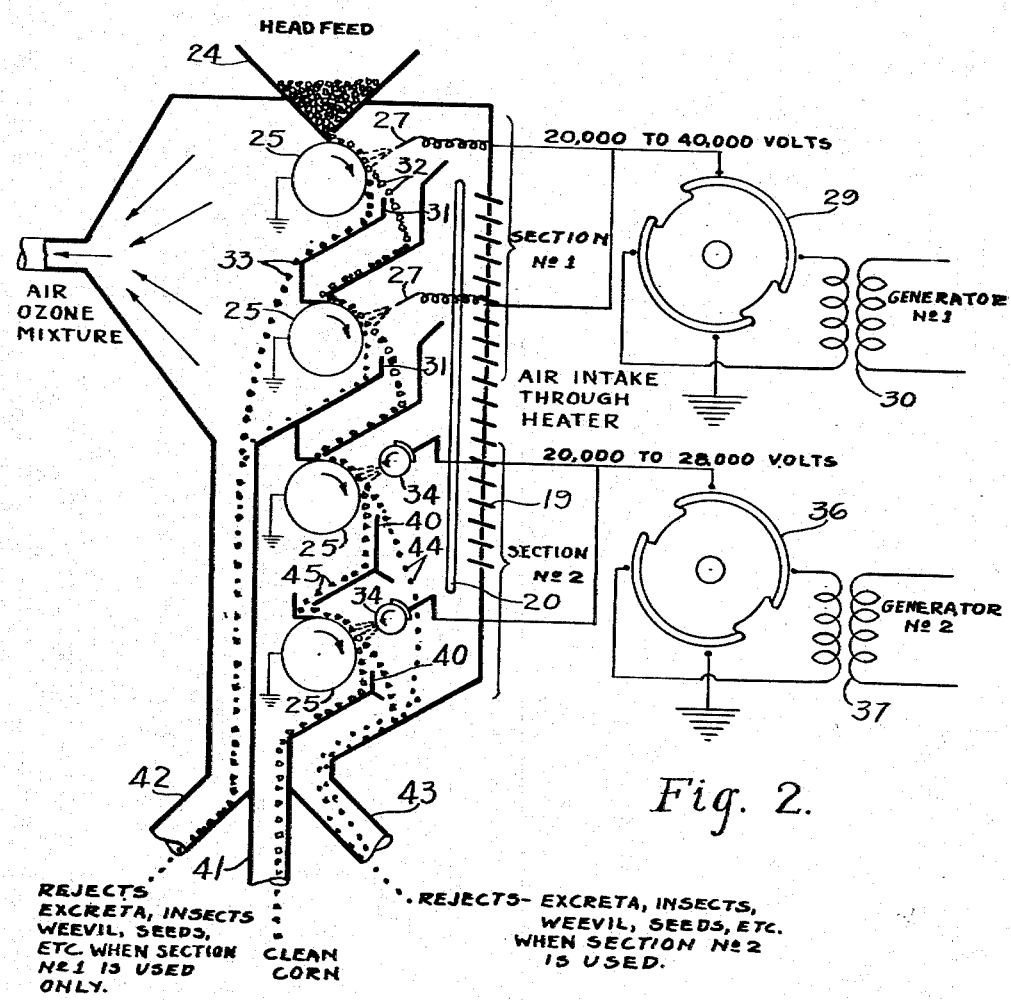
Fig. 2 is a diagrammatic elevation of the electrostatic separating apparatus shown in Fig. 1.
Figure 3:
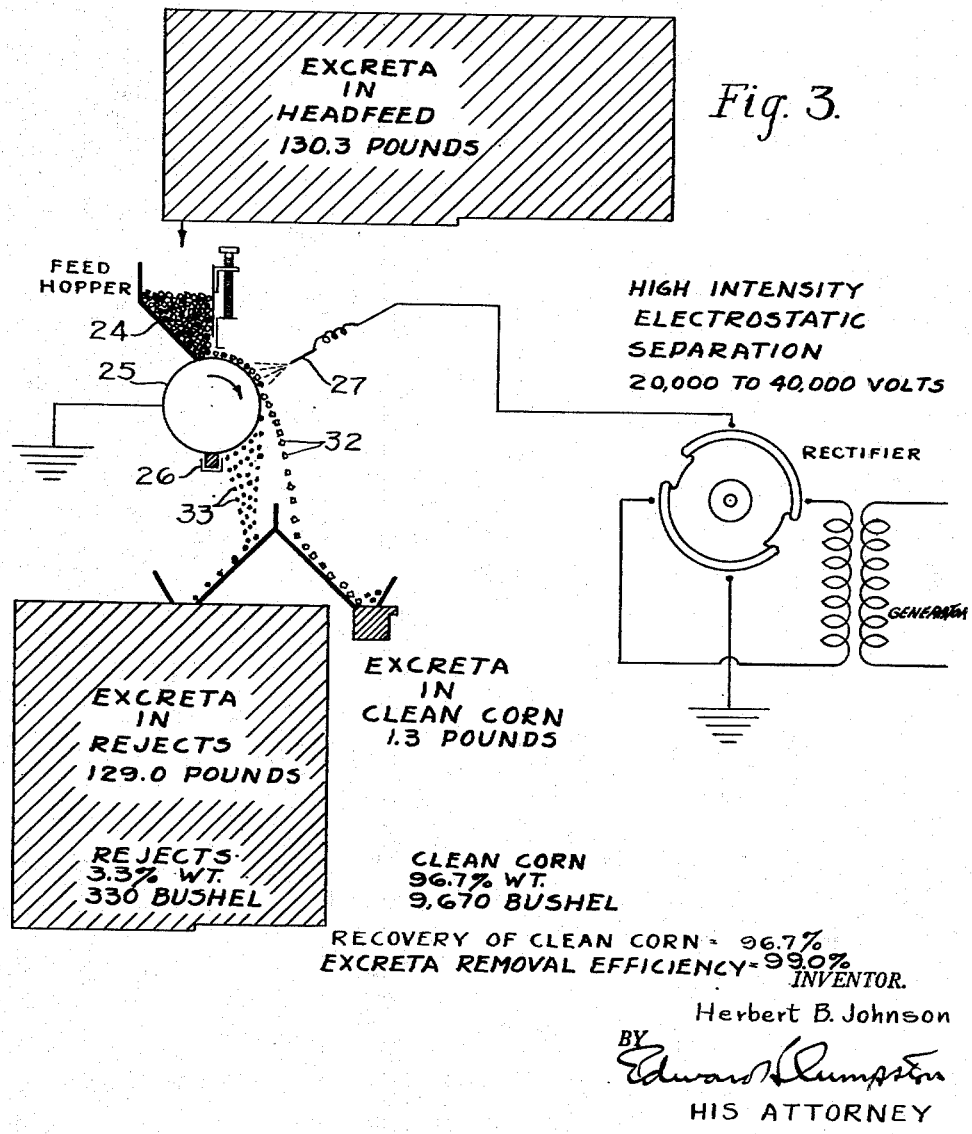
Fig. 3 is a diagrammatic elevation of a portion of the apparatus shown in Fig. 2.

With some types of corn and impurities and under some moisture conditions, as where the moisture content varies throughout a mixture, I have found it beneficial to employ both the high and low intensity types of separation in sequence, as shown in Fig. 2 where the mixture is first subjected to high intensity separation by the two pairs of such electrodes, designated "Section No. 1," and then subjected to low intensity separation by the two pairs of corresponding electrodes designated "Section No. 2," with the result that the clean corn is discharged through the conductor 41 while the rejected impurities are discharged through the conductors 42 and 43. Thus the corn which has been partially cleaned in Section 1 by the removal of low moisture content excreta and other impurities, still contain at times a small percentage of high moisture content excreta which is not readily removed by the high intensity electrostatic treatment applied in Section 1 and I therefore pass this partially cleaned corn by gravity flow through Section 2 in which the high moisture content excreta is readily repelled as at 44 (Fig. 2), thereby producing a very clean whole corn product 45, by taking advantage of the pecularities which I have discovered in the electrostatic behavior of high and low moisture content particles of corn and its impurities in low intensity and high intensity fields, respectively, of the character described. By means of such an arrangement of the apparatus, either type of separation alone may be resorted to or both may be employed in series as described.

The applicability and advantages of these high and low intensity separations are illustrated by the following examples of representative tests on different raw corn mixtures having moisture contents above and below about 15%, respectively. These show that the low intensity method gives the highest whole corn recovery and cleaning efficiency with moisture content of above 15%, but affords low recovery and cleaning efficiency on corn with moisture content below 15%. On the other hand, the high intensity method shows poor recovery and efficiency on high moisture corn, but high recovery and efficiency on corn with a moisture content below about 15%.

| Moisture | | Charged Electrode | Recovery of Corn | Pellet Removal Efficiency |
| --- | --- | --- | --- | --- |
| Corn | Pellets | | | |
| 19.60 | 19.40 | Repelling | 95.1 | 100.0 |
| 15.97 | 10.42 | do | 62.4 | 52.0 |
| 19.90 | 20.78 | Spray | 84.2 | 50.0 |
| 14.21 | 7.50 | do | 99.2 | 100.0 |

It is apparent from the above description that my invention serves to greatly simplify the process of cleaning corn by making it possible to eliminate some units of equipment now in use such as gravity separators, sizers, classifiers, floatation and washing devices and their associated elevators and conveyors, as well as substantially reducing the required capital investment and operating and maintenance expenses. At the same time, it has been found practicable, by the use of my invention, to reclaim 92 to 98% by weight of sterilized clean corn and maintain a continuous cleaning efficiency of 98% or more, at a quantity production rate per unit of from 100 to as high as 1,000 bushels of raw corn head feed per hour.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the apparatus parts and in the combination and order of method steps will readily occur to those skilled in the art, within the spirit of the invention and the scope of the appended claims.

I claim:

1. The method of separating a mixture of whole corn grains and impurities comprising the steps of delivering said mixture to a rotary grounded electrode, releasing said mixture from said rotary electrode under centrifugal and gravitational forces, subjecting said mixture adjacent the point of release from said rotary electrode to an ionizing bombardment from a thin, ribbon-like, metal blade electrode located adjacent said point of release and charged with an ionizing voltage between about 20,000 and about 40,000 volts to subject said mixture to a uniform corona discharge field and depress the mixture particles in proportion to their electrical resistances, rotating said rotary electrode to produce a linear surface speed between about 200 and about 300 feet per minute, regulating said rotary electrode speed and the voltage of said blade electrode to centrifugally repel a first portion of corn grains and impurities of greater mass and lesser electrical resistance in advance of a second portion of impurities of lesser mass and greater electrical resistance, delivering said first portion to a second rotary grounded electrode forming one of a second pair of spaced electrodes for discharge thereby through an electrostatic field between said electrodes, rotating said second electrode at a linear surface speed of not more than about one hundred feet per minute, maintaining the electrodes of said second pair at a unidirectional electrical potential difference of between about 20,000 and about 28,000 volts, to release the corn grains of said second portion to fall by gravity and to repel the impurities of said second portion in advance of said corn grains, and separately collecting said corn grains and the impurities of said first and second portions.

2. The method of separating a mixture of whole corn grains and impurities comprising the steps of drying and cooling said mixture, delivering said mixture to a rotary grounded electrode, releasing said mixture from said electrode under centrifugal and gravitational forces, subjecting said mixture adjacent the point of release from said electrode to an ionizing bombardment from a thin, ribbon-like, metal blade electrode located adjacent said point of release and charged with an ionizing voltage of between about 20,000 and about 40,000 volts to subject said mixture to a uniform corona discharge field and depress the mixture particles in proportion to their electrical resistances, rotating said rotary electrode to produce a linear surface speed of between about 200 and about 300 feet per minute, regulating said rotary electrode speed and the voltage of said blade electrode to centrifugally repel a first portion of corn grains and impurities of greater mass and lesser electrical resistance in advance of a second portion of impurities of lesser mass and greater electrical resistance, passing a current of gas through said field to form a mixture therewith of ozone gas produced by said field and passing said ozonized gas in contact with said mixture to sterilize the same, delivering said first portion to a second rotary grounded electrode forming one of a second pair of spaced electrodes for discharge thereby through an electrostatic field between said electrodes, rotating the other of said second pair of electrodes, rotating said second grounded electrode at a linear surface speed of not more than about 100 feet per minute, maintaining the electrodes of said second pair at a unidirectional electrical potential difference of between about 20,000 and about 28,000 volts, to release the corn grains of said second portion to fall by gravity and to repel the impurities of said second portion in advance of said corn grains, and separately collecting said corn grains and the impurities of said first and second portions.

3. The method of separating a mixture of whole corn grains and impurities comprising the steps of delivering said mixture to a rotary grounded electrode, releasing said mixture from said rotary electrode under centrifugal and gravitational forces, subjecting said mixture adjacent the point of release from said rotary electrode to an ionizing bombardment from a discharge electrode located adjacent said point of release and charged with an ionizing voltage between about 20,000 and about 40,000 volts to depress the mixture particles in proportion to their electrical resistances, rotating said rotary electrode to produce a linear surface speed between about 200 and about 300 feet per minute, regulating said rotary electrode speed and the voltage of said discharge electrode to centrifugally repel the corn grains of greater mass and lesser electrical resistance in advance of said impurities of lesser mass and greater electrical resistance, and separately collecting said corn grains and impurities.

4. The method of separating a mixture of whole corn grains and impurities comprising the steps of maintaining the moisture content of said mixture by drying portions of said mixture having a high moisture content of more than about 15%, delivering said mixture to a rotary grounded electrode, releasing said mixture from said rotary electrode under centrifugal and gravitational forces, subjecting said mixture adjacent the point of release from said rotary electrode to an ionizing bombardment from a discharge electrode located adjacent said point of release and charged with an ionizing voltage between about 20,000 and about 40,000 volts to depress the mixture particles in proportion to their electrical resistance, rotating said rotary electrode to produce a linear surface speed between about 200 and about 300 feet per minute, regulating said rotary electrode speed and the voltage of said discharge electrode to centrifugally repel the corn grains of greater mass and lesser electrical resistance in advance of said impurities of lesser mass and greater electrical resistance, and separately collecting said corn grains and impurities.

5. The method of separating a mixture of whole corn grains and impurities comprising the steps of delivering said mixture to a grounded rotary cylindrical electrode, releasing said mixture from said rotary electrode under centrifugal and gravitational forces, subjecting said mixture adjacent the point of release from said rotary electrode to an ionizing bombardment from a ribbon electrode edge having an effective edge thickness between about 0.003 and about 0.015 of an inch and extending substantially continuously throughout the length of said rotary electrode, said ribbon electrode edge being located adjacent said point of release and charged with a relatively high ionizing voltage to depress the mixture particles in proportion to their electrical resistance, regulating the linear surface speed of said rotary electrode and the voltage of said ribbon electrode to centrifugally repel the corn grains of greater mass and lesser electrical resistance in advance of said impurities of lesser mass and greater electrical resistance, and separately collecting said corn grains and impurities.

6. The method of separating a mixture of whole corn grains and impurities comprising the steps of delivering said mixture to a grounded rotary cylindrical electrode, releasing said mixture from said rotary electrode under centrifugal and gravitational forces, subjecting said mixture adjacent the point of release from said rotary electrode to an ionizing bombardment from a ribbon electrode edge having an effective edge thickness between about 0.003 and about 0.015 of an inch and extending substantially continuously throughout the length of said rotary electrode, said ribbon electrode edge being located adjacent said point of release and charged with an ionizing voltage between about 20,000 and about 40,000 volts to depress the mixture particles in proportion to their electrical resistance, rotating said rotary electrode to produce a linear surface speed between about 200 and about 300 feet per minute, regulating said rotary electrode speed and the voltage of said ribbon electrode to centrifugally repel the corn grains of greater mass and lesser electrical resistance in advance of said impurities of lesser mass and greater electrical resistance, and separately collecting said corn grains and impurities.

7. The method of separating a mixture of whole corn grains and impurities comprising the steps of delivering said mixture to a rotary grounded electrode, releasing said mixture from said rotary electrode to fall freely in space under centrifugal and gravitational forces, subjecting said mixture adjacent the point of release from said rotary electrode, to an ionizing bombardment from a thin, ribbon-like, metal blade electrode located adjacent said point of release at an angle of not more than about 30° above the horizontal plane through the center of said rotary electrode and on the opposite side of a vertical plane tangent to said rotary electrode adjacent said release point, said blade electrode being charged with an ionizing voltage between about 20,000 and about 40,000 volts to subject said mixture to a uniform corona discharge field and depress the mixture particles in proportion to their electrical resistances, rotating said rotary electrode to produce a linear surface speed between about 200 and about 300 feet per minute, regulating said rotary electrode speed and the voltage of said blade electrode to centrifugally repel the corn grains of greater mass and lesser electrical resistance in advance of said impurities of lesser mass and greater electrical resistance, and separately collecting said corn grains and impurities.

8. The method of cleaning corn from a mixture of corn and impurity portions comprising the steps of delivering said mixture to a rotary electrode forming one of a pair of spaced electrodes for discharge thereby under centrifugal and gravitational forces through an electrostatic field between said electrodes, maintaining said electrodes at a relatively high difference of unidirectional electrical potential to subject said discharged mixture to an ionizing bombardment in said field, coordinating the surface speed of said rotary electrode and said potential difference to repel one of said mixture portions and depress the other portion, passing a current of gas through said field to form a mixture therewith of ozone gas produced by said field, passing said ozonized gas in contact with said mixture to sterilize the same, and separately collecting said corn and impurity portions.

9. The method of cleaning corn from a mixture of corn and impurity portions comprising the steps of drying and cooling said mixture, delivering said mixture to a rotary electrode forming one of a pair of spaced electrodes for discharge thereby under centrifugal and gravitational forces through an electrostatic field between said electrodes, maintaining said electrodes at a relatively high difference of unidirectional electrical potential to subject said discharged mixture to an ionizing bombardment in said field, coordinating the surface speed of said rotary electrode and said potential difference to repel one of said mixture portions and depress the other portion, passing a current of heated air through said field to form a mixture therewith of ozone gas produced by said field, passing said ozonized gas in contact with said mixture to dry and sterilize the same, and separately collecting said corn and impurity portions.

10. In an electrostatic separation apparatus, a rotary, grounded, conveying electrode, a stationary electrode comprising a thin, ribbon-like metal blade substantially coextensive in length with said rotary electrode, said blade having a thickness between about 0.003 and 0.015 of an inch, means engaging said blade adjacent the ends thereof and supporting the same with a discharge edge in spaced, parallel relation with the surface of said rotary electrode, means for charging said blade electrode with a voltage between about 20,000 and about 40,000 volts to effect a uniform corona discharge field between said electrodes, means for delivering a mixture of materials to be separated to said conveying electrode in a thin stream distributed longitudinally thereof for delivery thereby in free-falling flow through said field for separation thereby, and means for separately collecting the materials separated by said apparatus.

11. In an electrostatic separation apparatus, a rotary, grounded, conveying electrode, a stationary electrode comprising a thin, ribbon-like, metal blade having a discharge edge substantially coextensive in length with said rotary electrode and between about 0.003 and 0.015 of an inch thick, means engaging said blade adjacent the ends thereof and supporting the same with the discharge edge thereof in spaced, parallel relation with the surface of said rotary electrode in a position not more than about 30° above a horizontal plane through the center of said rotary electrode and on the opposite side of a vertical plane tangent to the adjacent surface of said rotary electrode, means for charging said blade electrode with a voltage between about 20,000 and about 40,000 volts to effect a uniform corona discharge field between said electrodes, means for delivering a mixture of materials to be separated to said conveying electrode in a thin stream distributed longitudinally thereof for delivery thereby in free-falling flow through said field for separation thereby, and means for separately collecting the materials separated by said apparatus.

12. In an electrostatic separation apparatus, a rotary, grounded, conveying electrode, a stationary electrode comprising a thin, ribbon-like metal blade substantially coextensive in length with said rotary electrode, said blade having a thickness between about 0.003 and 0.015 of an inch, means engaging said blade adjacent the ends thereof and supporting the same with a discharge edge in spaced, parallel relation with the surface of said rotary electrode, means for charging said blade electrode with a voltage between about 20,000 and about 40,000 volts to effect a uniform corona discharge field between said electrodes, means for delivering a mixture of materials to be separated to said conveying electrode in a thin stream distributed longitudinally thereof, means for rotating said conveying electrode to produce a linear surface speed between about 200 and 300 feet per minute to discharge said materials in free-falling flow through said field for separation thereof by the combined action of centrifugal force and said discharge field, and means for separately collecting the materials separated by said apparatus.

13. In an electrostatic separation apparatus, a rotary, grounded, conveying electrode, a stationary electrode comprising a thin, ribbon-like, metal blade having a discharge edge substantially coextensive in length with said rotary electrode and between about 0.003 and 0.015 of an inch thick, means engaging said blade adjacent the ends thereof and supporting the same with the discharge edge thereof in spaced parallel relation with the surface of said rotary electrode in a position not more than about 30° above a horizontal plane through the center of said rotary electrode and on the opposite side of a vertical plane tangent to the adjacent surface of said rotary electrode, means for charging said blade electrode with a voltage between about 20,000 and about 40,000 volts to effect a uniform corona discharge field between said electrodes, means for delivering a mixture of materials to be separated to said conveying electrode in a thin stream distributed longitudinally thereof, means for rotating said conveying electrode to produce a linear surface speed between about 200 and about 300 feet per minute to discharge said materials in free-falling flow through said field for separation thereof by the combined action of centrifugal force and said discharge field, and means for separately collecting the materials separated by said apparatus.

14. In an electrostatic separation apparatus, a rotary, grounded, conveying electrode, a stationary electrode comprising a thin, ribbon-like metal blade substantially coextensive in length with said rotary electrode, said blade having a thickness between about 0.003 and 0.015 of an inch, means engaging said blade adjacent the ends thereof and supporting the same with a discharge edge in spaced, parallel relation with the surface of said rotary electrode, means for charging said blade electrode with a voltage between about 20,000 and about 40,000 volts to effect a uniform corona discharge field between said electrodes, means for delivering a mixture of materials to be separated to said conveying electrode in a thin stream distributed longitudinally thereof, means for rotating said conveying electrode to produce a linear surface speed between about 200 and 300 feet per minute to discharge said materials in free-falling flow through said field for separation thereof by the combined action of centrifugal force and said discharge field, means for passing a current of gas through said field to form a mixture therewith of ozone gas produced by said field, means for passing said ozonized gas in contact with said mixture to sterilize the same, and means for separately collecting the separated materials.

References Cited in the file of this patent

UNITED STATES PATENTS

| Number | Name | Date |
|---|---|---|
| 899,364 | Wentworth | Sept. 22, 1908 |
| 997,322 | Payne | July 11, 1911 |
| 1,152,442 | Schniewind | Sept. 7, 1915 |
| 1,179,936 | Kraus | Apr. 18, 1916 |
| 1,236,658 | Baumann | Aug. 14, 1917 |
| 1,422,026 | Brown | July 4, 1922 |
| 2,135,716 | Johnson | Nov. 8, 1938 |
| 2,154,682 | Johnson | Apr. 18, 1939 |
| 2,187,637 | Sutton | Jan. 16, 1940 |
| 2,213,510 | Wiegand | Sept. 3, 1940 |
| 2,398,792 | Johnson | Apr. 23, 1946 |
| 2,466,371 | Byrd | Apr. 5, 1949 |
| 2,548,771 | Carpenter | Apr. 10, 1951 |

OTHER REFERENCES

"Electrostatic Separation of Solids," by Fraas & Ralston, Industrial Engineering, vol. 32, pp. 600–604.